March 2, 1965   C. K. OSBORN ETAL   3,171,148
SYSTEM FOR THE REMOVAL OF PIPE LINE CLEAN-OUT MEMBERS
Filed June 7, 1962
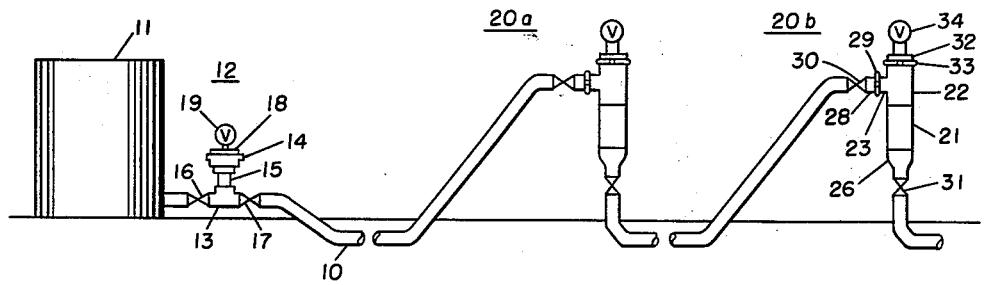
FIG. 1
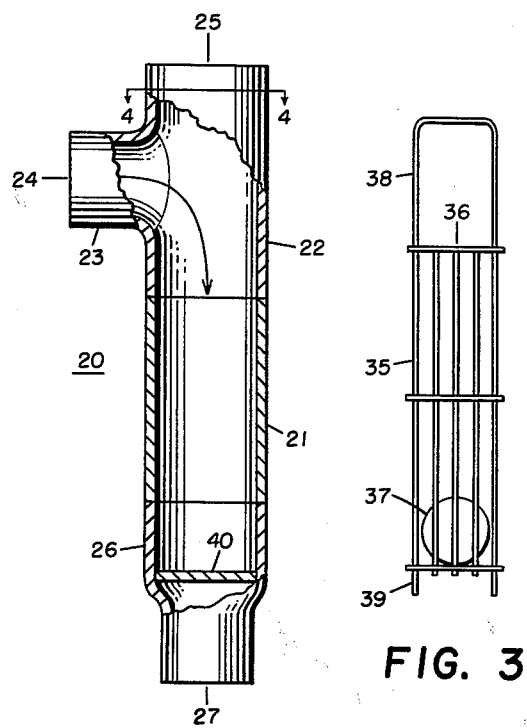
FIG. 2
FIG. 3
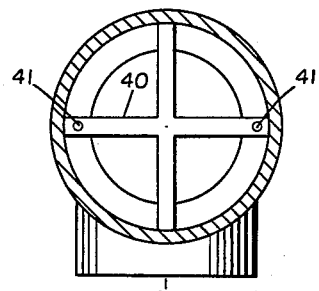
FIG. 4
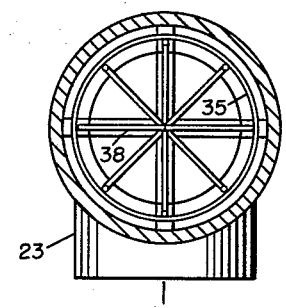
FIG. 5
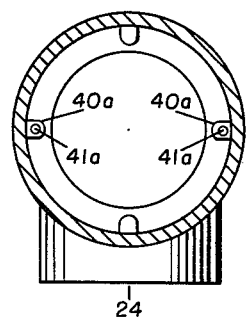
FIG. 6

United States Patent Office 3,171,148
Patented Mar. 2, 1965

3,171,148
SYSTEM FOR THE REMOVAL OF PIPE LINE CLEAN-OUT MEMBERS
Charles K. Osborn, Irving, and Billy J. Tibbets, Midland, Tex., assignors to Socony Mobil Oil Company, Inc., a corporation of New York
Filed June 7, 1962, Ser. No. 200,757
3 Claims. (Cl. 15—104.06)

This invention relates to a system used in the operation and maintenance of pipe lines and more particularly to a system for removing clean-out members employed to clean out pipe lines.

In the maintenance of a pipe line, clean-out members or scraper balls are inserted into the pipe line to clean out and remove deposits of material which may form on the inner wall of the pipe line. The clean-out members are inserted into the pipe line at one end and are moved by the flow of oil through the pipe line. Removal devices are employed downstream to trap and remove the clean-out members from the pipe line. Different types of devices have been employed in the past for removing the clean-out members; however, the devices which have been used to perform such operations have certain disadvantages. For example, some of the removal devices employed require special branch pipes or other expensive auxiliary equipment. In addition, the removal of clean-out members by the devices employed may result in the loss of oil or may require a great deal of time. Furthermore, some of the removal devices employed cannot be used both to remove and insert clean-out members which may be desired at a point intermediate a pipe line.

In accordance with the present invention, a device for removing clean-out members is provided whereby the above disadvantages are overcome. The removal device comprises a housing member having a passageway therein and first and second openings in the housing member leading to the passageway. Coupling means are provided for coupling the housing member to a flow line for allowing fluid in the flow line to flow through the passageway by way of a path extending from the first opening to the second opening and for allowing clean-out members employed in the flow line to flow into the passageway. The housing member also has a third opening formed therein and leading to the passageway. A cover is provided which is removably fitted over the third opening. A pervious container having an opening for receiving clean-out members is provided for insertion into and for removal from the passageway through the third opening. Means are provided for supporting and orienting the opening of the container in line with the flow path from the first opening to the passageway to permit clean-out members passing from the flow line into the passageway to be trapped in the container. The cross section of at least a portion of the passageway is larger than that of the basket and of a size to allow fluid to flow around clean-out members trapped in the basket. The container with the trapped clean-out member is withdrawn from the passageway by way of the third opening.

For further objects and advantages of the present invention and for a more complete understanding thereof, reference may be had now to the following detailed description taken in conjunction with the accompanying drawings wherein:

FIGURE 1 illustrates removal devices of the present invention coupled to a pipe line;

FIGURE 2 illustrates the housing member of a removal device with the interior thereof partially exposed;

FIGURE 3 illustrates a basket which may be inserted into and removed from the housing member illustrated in FIGURE 2;

FIGURE 4 is an enlarged sectional view of the housing member taken along lines 4—4 of FIGURE 2 and illustrating a basket support means;

FIGURE 5 is a view similar to that of FIGURE 4, illustrating a basket position in the housing member;

FIGURE 6 is a view similar to that of FIGURE 4, illustrating a modified basket support means.

Referring now to FIGURE 1 of the drawing, there is disclosed a pipe line 10 coupled at one end to oil storage tank 11. The other end of the pipe line may lead to a terminal point such as a refinery. Oil flows from the tank 11 through pipe line 10 and through devices 12, 20a, and 20b coupled to the pipe line. The device 12 is used to insert clean-out members or scraper balls into the pipe line to remove deposits of material which may form on the inner wall of the pipe line. The devices 20a and 20b are used to remove clean-out members from the pipe line and are located respectively intermediate the length of pipe line 10 and at the end of the pipe line 10. Both of the devices 20a and 20b employ removable baskets in their housing members for trapping clean-out members as will be described hereinafter. The removal device 20b is a preferred embodiment of the present invention and is employed at the end of the pipe line 10. It may be modified, however, to form the removal device 20a which may be used to remove and reinsert clean-out members intermediate the length of a pipe line if such use becomes desirable.

Before describing the manner in which clean-out members are inserted into the insertion device 12 for passage through the pipe line, there will be described the removal devices 20a and 20b. The preferred removal device 20b will be described first along with the modification thereof which allows it to be used intermediate the pipe line 10.

Referring to FIGURE 2 of the drawing, the removal device 20b is illustrated as comprising a housing member 20 having a passageway extending therethrough from the opening 24 to the opening 27 for passage of oil. As illustrated in FIGURE 4, the member 40, located in the passageway, is a cross-shaped member and does not interfere with the flow of oil through the device 20b. The flow path through the housing member 20 is illustrated by the arrow. A basket 35 illustrated in FIGURE 3 is provided for insertion into the housing member 20 by way of the opening 25 to trap and remove clean-out members passing into the passageway from the pipe line 10. The basket 35 is supported in an enlarged portion of the housing member 20 by the support member 40 to allow oil to flow around clean-out members trapped in the basket.

As illustrated in FIGURE 1, a removable cover 32, having a bleeder valve 34, is coupled to the top of the housing member 20 by a quick-opening coupling member, such as a snap coupling 33. The cover 32 can be removed to allow the basket 35 to be inserted into and removed from the passageway of the housing member 20 by way of the opening 25. A handle 38 is provided to aid in the removal and insertion operation.

The bottom of the basket 35 is provided with orienting legs 39 to orient the opening 36 of the basket in line with the oil flow path extending from the opening 24 to the passageway in the housing member 20. These legs extend from the basket in the same plane as that of the handle 38. The basket support member 40, illustrated in FIGURES 2 and 4, is attached to the inner wall structure of the reducing member 26 to support the basket in the housing member 20. This support member has apertures 41 extending therethrough for receiving the legs 39 of the basket 35.

As illustrated in FIGURE 4, the apertures 41 extend through the support member 40 in a plane perpendicular to the aperture 24 leading into the passageway of the housing member 20. Since the handle 38 and the legs 39 extend from the basket 35 in the same plane, the handle 38 will not prevent clean-out members from passing into the basket 35 when the legs 39 are inserted in the apertures 41. FIGURE 5 illustrates the position of the handle 38 when the basket 35 is located in the passageway. From a comparison of FIGURES 2 and 3, it can be seen also that the handle 38 will extend above the aperture 24 when the basket is positioned in place.

Referring again to the housing member 20, the cross section of the housing member 20 above the support member 40 is enlarged to allow oil to flow around clean-out members such as scraper ball 37, trapped in the basket 35. In one embodiment, the inside diameter of this portion of the housing member 20 was 4 inches, the outside diameter of the basket was 3.75 inches, the inside diameter of the basket was 3.5 inches, and the inside diameter of the pipe line was 3 inches. The relative sizes of the basket 35 and the passageway extending through the housing member are illustrated in FIGURE 5.

It is to be noted also that the support member 40 is in the form of a cross member extending across the passageway of the housing member 20. With this arrangement, a safety means is provided at all times to prevent clean-out members from being caught in the pipe line downstream of the device 20b where the pipe line may lead to other storage or treating facilities. Thus, if the basket 35 is removed during clean-out operations without the knowledge of the operators, the support member 40 will stop the clean-out members at the device 20b.

In another embodiment of the present invention, the removal device 20b may be modified to form the removal device 20a which may be used at a point intermediate the pipe line 10. This device is identical with the device 20b except that lugs 40a (FIGURE 6) are employed to support the basket 35 instead of support member 40. These lugs extend only a short distance into the passageway. With this arrangement, clean-out members will be able to pass through the removal device 20a and into the pipe line 10 by way of the opening 27 when the basket 35 is removed. The device 20a can be used intermediate a pipe line to trap clean-out members for inspection and then to allow the clean-out members to be reinserted into the pipe line 10 through the opening 25 of the housing member when the basket 35 is removed. In addition, the basket 35 can be removed to allow clean-out members or other members, such as interface separation members, to flow without interruption from the insertion device 12 to the removal device 20b.

In the embodiment of FIGURE 6, the supporting lugs 40a are secured to the inner wall structure of the reducing member 26 at a point spaced from the opening 27 the same distance as the support member 40. Two of the lugs 40a have apertures 41a extending therethrough for receiving the legs 39 of the basket 35.

In one embodiment of the present invention, the housing member 20 of the removal devices is formed by a cylindrical member 21 which has a T 22 attached to the top end thereof and the enlarged portion of a swaged nipple or reducing member 26 attached to the bottom. One end 23 of the T 22 is coupled to the pipe line 10 by way of coupling member 28, snap coupling 29, and gate valve 30. The reducing member 26 is coupled to the pipe line 10 by way of a full opening valve 31.

The basket 35 can be inserted into the passageway of the housing member 20 by closing valves 30 and 31, opening valve 34 to relieve pressure in the housing member between valves 30 and 31, and opening the snap coupling 33 to remove the cover 32. After the basket is inserted, cover 32 is replaced, valve 34 is closed, and valves 30 and 31 are opened.

The insertion device 12 comprises a T 13 to which is coupled a quick-change union 14 by way of coupling member 15. The quick-change union 14 has a bleeder valve 19 coupled to the top 18 thereof. The T 13 is coupled to the pipe line 10 by way of gate valve 16 and gate valve 17. When it is desired to insert a clean-out member or scraper ball into the pipe line 10, valves 16 and 17 are closed and valve 19 is opened to relieve pressure in the insertion device between the two valves 16 and 17. Quick-change union 14 is then removed and a clean-out member is inserted into the T 13. The quick-change union 14 is then inserted back in place, valve 19 is closed, and valves 16 and 17 opened to allow the clean-out member to be moved through the pipe line 10 by the flow of oil therein.

Having described the invention, it will be understood that modifications may now suggest themselves to those skilled in the art, and it is intended to cover all those as fall within the scope of the appended claims.

What is claimed is:

1. Apparatus for removing clean out members from a flow line, comprising an elongated annular member having a flow passageway therein, said annular member adjacent one end being provided with an inlet opening in a side wall portion thereof constituting an inlet to said passageway and being provided adjacent the other end thereof with an outlet opening constituting an outlet from said passageway, said passageway adjacent said inlet opening having a substantially straight axis, means for coupling said annular member to said flow line for allowing fluid in said flow line to flow through said passageway and for allowing clean out members employed in said flow line to flow into said passageway, said annular member being provided with an axial opening in the end adjacent said inlet opening, a cover removably fitted over said axial opening, a fluid pervious container positioned within said passageway by insertion through said axial opening, said container having an open end and having retaining means at the other end thereof, a handle secured to said container and extending above the open end of said container, fixed support means within said annular member for supporting said container in said passageway in line with said inlet opening to permit clean out members passing from said flow line into said passageway to be trapped in said container, and means for orientating said container to position said handle clear of said inlet opening, said last mentioned means including complementary orientating means upon said fixed support means and upon the other end of said container, said container with trapped clean out members being removable from said passageway by way of said axial opening, and the cross section of at least a portion of said passageway being larger than that of said container and of a size to allow fluid to flow around clean out members trapped in said container.

2. Apparatus according to claim 1, wherein said container comprises a grid-like basket, and wherein said complementary orientating means comprise aperture means provided in said support means and leg means secured to said other end of said container and received within said aperture means.

3. In a hydrocarbon flow line system having hydrocarbon supply means, a flow line and at least one clean out member for the flow line, the improvement comprising apparatus including an elongated annular member having a flow passageway therein, said annular member adjacent one end being provided with an inlet opening in a side wall portion thereof constituting an inlet to said passageway and being provided adjacent the other end thereof with an outlet opening constituting an outlet from said passageway, said passageway adjacent said inlet opening having a substantially straight axis, means for coupling said annular member to said flow line for allowing fluid in said flow line to flow through said passageway and for allowing clean out members employed in said flow line to flow into said passageway, said annular member being provided with an axial opening in the end adjacent said inlet opening, a cover removably fitted over said axial opening, a fluid pervious container positioned within said passageway by insertion through said axial opening, said container having an open end for receiving clean out members from said flow line, the cross section of at least a portion of said passageway being larger than that of said container and of a size to allow fluid to flow around clean out members trapped in said container, stationary support means within said annular member extending into said passageway for receiving and supporting thereon said container with its open end orientated to receive clean out members entering said passageway through said inlet opening, and retaining means for preventing clean out members from flowing through said passageway to said outlet opening in the absence of said container, said last mentioned means being constituted by said stationary support means which extends into said passageway.

References Cited in the file of this patent

UNITED STATES PATENTS 1,798,441    Weiss _____ Mar. 31, 1931

FOREIGN PATENTS 277,230    Italy _____ Sept. 2, 1930
431,750    Great Britain _____ July 15, 1935